United States Patent [19]

DeRosa et al.

[11] Patent Number: 5,152,909
[45] Date of Patent: Oct. 6, 1992

[54] ANTIOXIDANT/CORROSION RESISTANT ADDITIVE FOR RAILWAY DIESEL CRANKCASE LUBRICANTS

[75] Inventors: Thomas F. DeRosa, Passaic, N.J.; Rodney L. Sung, Fishkill; Benjamin J. Kaufman, Hopewell Junction, both of N.Y.

[73] Assignee: Texaco Inc., White Plains, N.Y.

[21] Appl. No.: 688,802

[22] Filed: Apr. 22, 1991

[51] Int. Cl.$^5$ ................ C10M 133/00; C10M 135/00
[52] U.S. Cl. .................: 252/47.5; 525/345; 525/374; 548/142
[58] Field of Search ............... 252/47.5; 525/345, 374; 548/142

[56] References Cited

U.S. PATENT DOCUMENTS

| | | | |
|---|---|---|---|
| 3,914,241 | 10/1975 | Elliott et al. | 548/142 |
| 4,089,794 | 5/1978 | Engel et al. | 252/51.5 A |
| 4,144,034 | 3/1979 | Cummings | 44/407 |
| 4,193,882 | 3/1980 | Gemmill, Jr. | 548/142 |
| 4,357,250 | 11/1982 | Hayashi | 252/51.5 A |
| 4,562,260 | 12/1983 | McDaniel, Jr. et al. | 548/142 |
| 4,659,337 | 4/1987 | Sung | 44/407 |
| 4,904,403 | 2/1990 | Karol | 252/47.5 |
| 5,013,469 | 5/1991 | DeRosa et al. | 252/47.5 |
| 5,055,584 | 10/1991 | Karol | 252/47.5 |

Primary Examiner—Prince Willis, Jr.
Assistant Examiner—Silbg310101 James M.
Attorney, Agent, or Firm—Robert A. Kulason; James J. O'Loughlin; Vincent A. Mallare

[57] ABSTRACT

A railway diesel crankcase lubricant composition comprising a major portion of a diesel lubricating oil and a minor amount of, as an oxidation and corrosion inhibiting additive, a condensate product prepared by the process comprising:

(a) reacting a dibasic acid anhydride with an oligomeric isobutylene to form a succinic anhydride;

(b) reacting the succinic anhydride with an N-alkyl alkylene diamine to produce a succinimide-amine;

(c) reacting the succinimide-amine with a polyaromatic diisocyanate to produce a phenylurea isocyanophenylmethane;

(d) reacting the isocyanophenylmethane with a heterocyclic compound containing a thiadiazole nucleus to a condensation product of a mercapto-thiadiazole-phenylmethane; and (e) recovering the condensation product.

4 Claims, No Drawings

ANTIOXIDANT/CORROSION RESISTANT ADDITIVE FOR RAILWAY DIESEL CRANKCASE LUBRICANTS

BACKGROUND OF THE INVENTION

This invention relates to a functionalized oligomeric lubricant additive which imparts both enhanced antioxidancy and corrosion resistance upon dissolution in lubricating oils.

More specifically, this invention relates to railway diesel lubricants and, more particular, to diesel fuels containing anti-corrosion and anti-oxidation additives for improving the corrosion inhibition and anti-oxidation properties in motor fuels.

The price of diesel fuel has increased dramatically over the past 10 years. For example, the price of marine diesel fuel has increased from $11 a metric ton to a high of about $200 a metric ton. Additionally, a similar increase in fuel cost has been experienced by the railroad industry. These price increases have resulted in the cost of fuel being the largest expense for the owners of any diesel fleet of vehicles. To try to obtain some relief from this large expense, the railroads have embarked on a program of mixing poorer grade fuels (such as marine residual) with regular D-2 diesel fuel. While they do realize a savings from this mixed fuel operation, performance problems arise, such as increased corrosion and poorer oxidative stability. The magnitude of the problem can be gauged by General Electric's spending $20 million dollars to build new test facilities to evaluate these parameters. General Motor is also exerting a similar type of effort.

The present invention deals with the scenario where diesel fuel (D-2) is extended with diesel residual fuel. More specifically, we have simulated the scenario wherein Railway Diesel Oil (RDO) is contaminated with a given amount of marine diesel residual fuel. We believe this to be a realistic test since during the normal engine operation D-2 gets into the diesel crankcase. Finally, the Union Pacific Oxidation Test (UPOT) was used to evaluate the effectiveness of the experimental additives in reducing corrosion and oxidative thickening of the RDO.

DISCLOSURE STATEMENT

U.S. Pat. No. 3,773,479 discloses the use of the reaction product of maleic anhydride and an alkyl or alkenyl amines as a carburetor detergent, corrosive inhibitor, and an anti-icing additive in motor oils.

U.S. Pat. No. 4,089,794 discloses how the incorporation of ethylenically unsaturated carboxylic acid material post-reacted with a polyamine, polyol, or a hydroxylamine becomes effective as a sludge control additive for lubricants.

U.S. Pat. No. 4,144,034 discloses the use of the reaction product of maleic anhydride and certain alkyl-alkylene diamines as a corrosion inhibitor and a carburetor detergent additive and corrosion inhibitor in motor fuels.

U.S. Pat. No. 4,290,778 discloses the use of the reaction product of a hydrocarbyl alkoxyalkylene diamine and maleic anhydride as a corrosion inhibitor and carburetor detergent additive in motor fuels.

U.S. Pat. No. 4,340,689 discloses a process for grafting a functional organic group onto an ethylene-propylene copolymer or an ethylene-propylene-diene terpolymer.

U.S. Pat. No. 4,357,250 discloses a method of incorporating ethylenically unsaturated carboxylic acid or acid anhydrides onto oligomeric or U.S. Pat. No. 4,904,403 disclosed a method incorporating 1,3,4-thiadiazole onto an oligomeric or polymeric substrate as an anti-wear additive in lubricating oils.

The disclosures in the foregoing patents which relate to antioxidancy and anti-corrosion for lubricating oils, namely U.S. Pat. Nos. 3,773,479; 4,089,794; 4,144,034; 4,290,778; 4,340,689; and 4,904,403 are incorporated herein by reference.

An objective of this invention is to provide a novel railway diesel crankcase lubricating additive that enhances the oxidative corrosion resistant properties of the oil.

Another objective of this invention is to provide concentrates of the novel additive of this invention.

SUMMARY OF THE INVENTION

According to the present invention, it has been found that the dissolution of the imidization reaction product of polyisobutylene containing one or more succinic anhydride or succinic acid moieties imidized with a polyalkylamine containing a diathiazole nucleus in oil causes two measurable and extremely desirable effect to the oil. Both these effects become apparent during engine operating conditions. The first effect pertains to enhanced oil oxidative resistance. This effect may be observed by measuring the oil viscosity. The second effect pertains to enhanced oil corrosion resistance. This effect may be observed by measuring the concentration of dissolved metallic ions such as lead, iron, copper, and tin contained in the oil.

The present invention provides a railway diesel crankcase lubricant composition comprising a major portion of a diesel lubricating oil and a minor amount of, as an oxidation and corrosion inhibiting agent, a condensate product prepared by the process comprising:

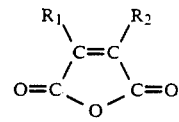

where $R_1$ and $R_2$ each are hydrogen or a $(C_1-C_{10})$ linear or branched alkyl or cyclic alkyl group; with an oligomeric isobutylene represented by the formula

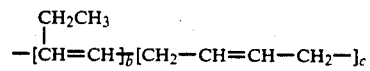

where the sum of the repeat units, b and c, are limited to the range of 10 to 500 so that the material has a corresponding molecular weight range from about 500 amu to 15,000 amu to form oligomeric(isobutylene-graft-succinic anhydride);

(b) reacting the oligomeric (isotutylene-graft-succinic anhydride with an N-alkyl diamine represented by the structure

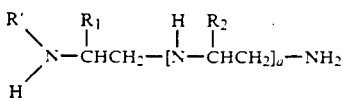

wherein R', $R_1$ and $R_2$ each are hydrogen or a ($C_1$-$C_{10}$) linear or branched hydrocarbon group and a is an integer between 0 to 7; to produce oligomeric[isobutylene-graft-)tetraethylenetetraamine)-succinimide)-amine];

(c) reacting the said oligomeric [isobutylene-graft-(tetraethylenetetraamine)-succinimide-amine] with a polyaromatic diisocyanate represented by the formula:

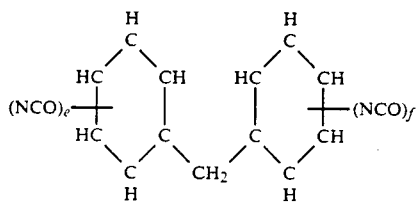

where e and f each are integers from 1 to 10 and the orientation of each isocyanate relative to one another is ortho, ortho; ortho,para; para,para; meta,-meta; ortho,meta; meta,para; to produce oligomeric[isobutylene-graft-((tetraethylenetetraamine)-succinimide)-4-phenylurea-4'isocyanophenylmethane];

(d) reacting said oligomeric [isobutylene-graft-(tetraethylenetetraamine)-succinimide)-4 -phenylurea-4'isocyanophenylmethane with a heterocyclic containing the 1,3,4-thiadiazole nucleus represented by the formula:

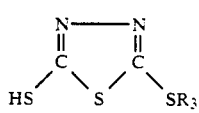

where $R_3$ is hydrogen or a ($C_1$-$C_{10}$) hydrocarbon or linear or branched aliphatic alcohol or amine; to produce a condensation product of oligomeric-[isobutylene-graft-((tetraethylenetetraamine)-succinimide)-4'-phenylurea-4'-[2-thiourea-(5-mercapto-1,3,4-thiadiazole)-phenylmethane]; and (e) recovering said condensation product of phenylmethane.

DETAILED DESCRIPTION OF THE INVENTION

The oil soluble additive of the present invention may be structurally represented as:

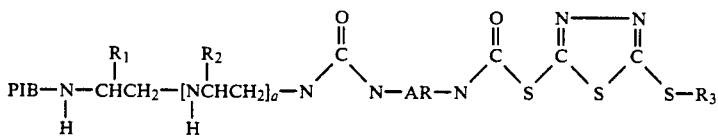

where $R_1$, $R_2$, and $R_3$ each are hydrogen or a ($C_1$-$C_{10}$) linear or branched alkyl, aryl, alkaryl aralkyl, hydroxylalkyl, or aminoalkyl group; a is an integer between 0 and 10, preferably having a value between 0 and 2; AR is an aromatic, polyaromatic, or heteroaromatic or polyheteroaromatic or polyaromatic-heteroaromatic group and PIB is polyisobutylene.

In the above formula, the PIB portion is an oligomeric isobutylene segment containing random 1,2- and 1,4-butylene repeat units shown below:

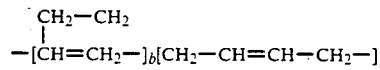

where the sum of the repeat units, b and c, respectively, vary from 10 to 50 so that the oligomer has a corresponding molecular weight range between 250 and 15,000 amu.

The N-alkyl alkyene polyamine portion is represented as

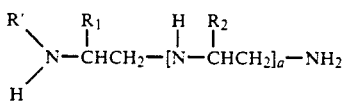

where R', $R_1$ and $R_2$ each are hydrogen or a ($C_1$-$C_{10}$) linear or branched aliphatic hydrocarbon group; and a is an integer between 0 and 10, preferably between 0 and 2.

The heterocyclic 1,3,4-thiadiazole nucleus of the present invention is structurally represented as:

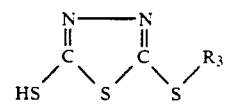

where $R_3$ is hydrogen or a ($C_1$-$C_{10}$) hydrocarbon or linear or branched aliphatic alcohol or amine.

The polyaromatic(diisocyanate) portion of this invention may be represented by the structural formula:

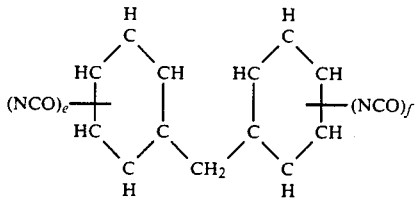

where e and f ar integers from 1 to 10 and the orientation of each isocyanate relative to one another is ortho,ortho; ortho,para; para,para; meta, meta; ortho, meta; meta, para, respectively.

The preferred orientation of each isocyanate relative to the other is para,para.

The dibasic anhydride of this invention is represented by the formula:

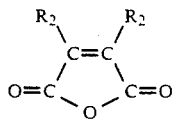

where $R_4$ and $R_5$ each are hydrogen or a ($C_1$–$C_{10}$) linear or branched alkyl or cyclic alkyl structure. Dibasic anhydrides that may be used include maleic anhydride; alpha-methyl maleic anhydride; alpha,beta dimethyl maleic anhydride; alpha, beta diethyl maleic anhydride; alpha-ethyl maleic anhydride; alpha,beta-di-n-propyl maleic anhydride; alpha-n-hexyl maleic anhydride; alpha, beta-di-n-hexyl maleic anhydride; alpha-n-nonyl maleic anhydride; alpha, beta-di-n-octyl maleic anhydride; alpha, beta-di-n-nonyl maleic anhydride. The preferred dibasic acid anhydride is maleic anhydride, however.

This invention is also directed to a marine crankcase lubricant composition containing the prescribed polyalkylated alkylimide of 1,3,4-thiadiazole which exhibit substantially reduced oxidation and corrosion tendencies.

The novel reaction product of this invention is prepared by a multistep process. Initially, oligomeric isobutylene, viz., oligomeric 1,3-butadiene containing random 1,2- and 1,4- repeat units where the sum of the repeat units, b and c, are limited to the range of 10 to 50 so that the material has a corresponding molecular weight range of from 500 to 15,000 amu, and such isobutylene is represented by the formula

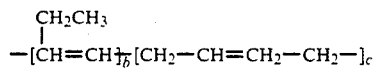

is reacted with an ethylenically unsaturated acid or, more preferably, an acid anhydride.

The preferred method of incorporation of maleic anhydride onto the oligomeric polyisobutylene is through the "ene" reaction. During this preferred method, oligomeric isobutylene and approximately 0.05 wt % to 5.00 wt % maleic anhydride are heated in the presence or absence of an inert reaction solvent. Heating is continued for a sufficient amount time to ensure that at least 95 wt % of the anhydride becomes chemically incorporated onto the oligomeric substrate, typically 0.5 hrs to 3.0 hrs. The molecular weight of the oligomeric substrate may range from about 300 amu to about 15,000 amu, in no case, however, should the molecular weight influence the ene reaction course.

Examples of oligomeric olefins amenable to the ene reaction include those derived from alpha-olefin monomers such as isoprene,isobutene,2-methyl-n-heptene,2,4-dimethyl-n-heptene, and the like.

The preferred oligomeric polyolefin is oligomeric isobutylene, however, and is available from the Amoco Chemical Company, Chicago, Ill. under the tradename ACTIPOL.

These above ene reaction intermediates are imidized using the reaction product of an N-alkyl-alklene diamine, maleic anhydride, and 2,5-dimercapto-1,3,4-thiadiazole.

The amines which may be employed in the present process include polyamines, preferably diamines, which bear at least two primary amine-$NH_2$ groups and at least one other amine groups. The latter may be mono- or di-substituted by linear or branched aliphatic hydrocarbons.

The preferred amine has the structural formula:

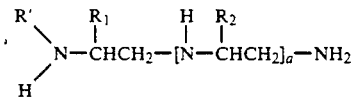

wherein $R'$, $R_1$ and $R_2$ each are hydrogen or a ($C_1$–$C_{10}$) linear or branched hydrocarbon group and a is an integer between 0 and 7, preferably between 0 and 2.

The preferred N-primary alkylalkylene diamines include triethylenepentaamine, tetraethylenehexamine, pentaethyleneheptaamine heptaamine, and hexaethylenemonaamine.

In accordance with the present invention, the process comprises the addition to the hydrocarbon fuel, of a minor deposit-inhibiting amount of, as a deposit-inhibiting additive, a reaction product of (a) an oligomeric olefin, (b) maleic anhydride, and (c) an N-alkyl-alkylene diamine and a 1,3,4-thiadiazole.

The synthetic process proceeds in four Phases and is summarized below.

Phase I

In this initial synthetic phase, maleic anhydride (A) is reacted with oligomeric olefins (B) to form the succinic anhydride adduct (C).

Phase II

In this second phase, an N-alkyl alkyene diamine (D) is reacted with pendant succinic anhydride groups (C) to generate the imidization intermediate (E)

Phase III

A ureathized intermediate (G) containing a terminal isocyanate is prepared by reacting with a 1:1 molar ratio of the imidization intermediate (E) generated in Phase II and a diisocyanate (F).

Phase IV

This is the coupling phase. In this phase the proceeding ureathized intermediate (G) is coupled with a mercaptothiadiazole (H) to generate a thiourethane moiety (J).

___FLOW DIAGRAM___

PHASE I.

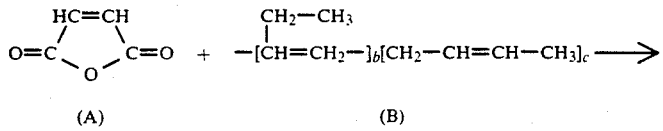

-continued
FLOW DIAGRAM
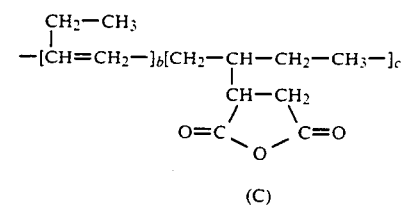
(C)
PHASE II
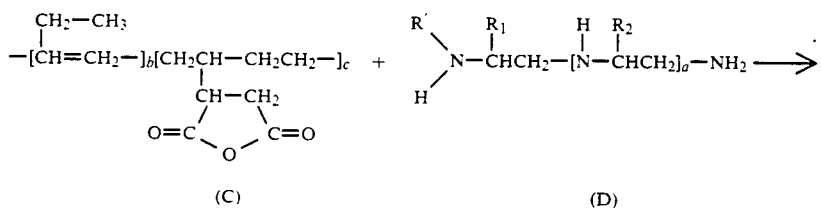
(C)  (D)
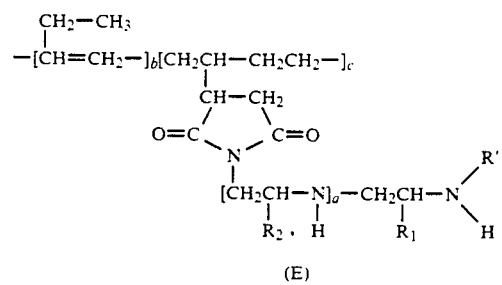
(E)
PHASE III
(E) + 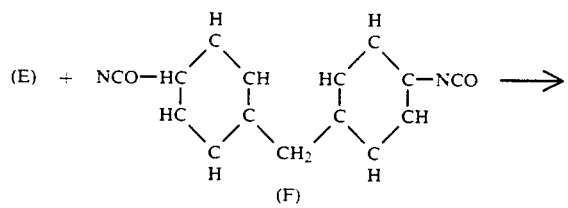 →
(F)
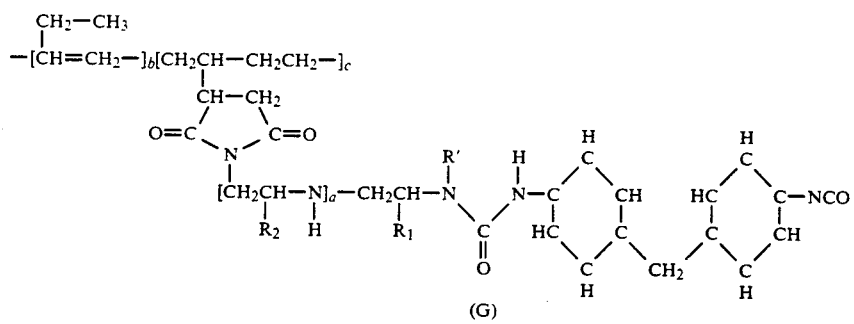
(G)
PHASE IV
(G) + 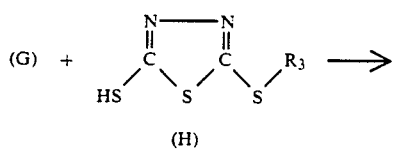 →
(H)

-continued
FLOW DIAGRAM

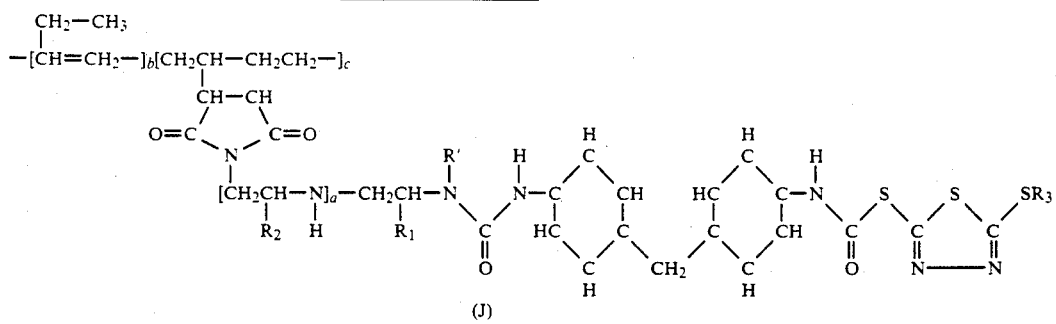

(J)

The following Examples are provided to illustrate the preferred method of preparing the present reaction product and the effectiveness of the product in railway diesel crankcase lubricants. It will be understood that the following examples are merely illustrative and not meant to limit the invention in any way.

EXAMPLE I

Preparation of Oligomeric(Isobutylene-graft-Succinic Anhydride)

In a preferred method for preparing the reaction product, maleic anhydride and polyisobutylene with an Mn = 900 are mixed together in toluene and heated to solvent reflux temperature for 5 hours under an inert and anhydrous atmosphere, such as nitrogen. The reagent weight ratios are chosen so that 0.10 wt % to 0.50 wt % of maleic anhydride is grafted to the oligomeric substrate to produce the oligomeric (isobutylene-graft-succinic anhydride).

EXAMPLE II

Preparation of Oligomeric[Isobutylene-graft-(Tetraethylenetetraamine)(Succinimide)-Amine]

In the preferred method for preparing this intermediate, a 2.1:1.0 to 2.3:1.0 molar ratio of tetraethylenehexamine and oligomeric(isobutylene-g-maleic anhydride), respectively, are dissolved in toluene and heated to reflux temperature for approximately four days under a protective blanket of nitrogen. The extent of imidization is monitored using the infrared absorbance stretching band appearing at 1705 cm-1. When the imidization process is completed, solvent is removed by distilling under reduced pressure and a white resinous material product is isolated.

EXAMPLE III

Preparation of Oligomeric[Isobutylene-graft-(Tetraethylene-tetraamine)-(Succinimide)-4-Phenylurea-4'-Isocyanophenylmethane]

A 1.0:1.05 molar ratio of oligomeric(isobutylene-g-[(tetra-methylenetetraamine succinimide]) and 4,4'-diisocyanophenylmethane, respectively, are dissolved in a 1:1 v/v mixture of tetrahydrofuran and toluene and the mixture stirred for 30 minutes at ambient temperature under anhydrous conditions. The ureaization product is identified by the appearance of a urea carbonyl infrared absorbance band at 1684cm-1; the intermediate, however, is not isolated.

EXAMPLE IV

Preparation of Oliogmeric[Isobutylene-graft-(Tetraethylenetetraamine)-(Succinimide)-4-Phenylures-4'-[2-Thiourea-(5-Mercapto-1,3,4-Thiadiazole-Phenylmethane]]

A reaction mixture consisting of a 1.0:1.0 molar ratio of 2,5-dimercapto-1,3,4-thiadiazole and oligomeric-(isobutylene-g-(tetramethylenetetraamine)-succinimide]-4-phenylurea 4'isocyanophenyl-methane)]dissolved in a 1:1 v/v mixture of tetrahydrofuran and toluene is stirred at ambient temperature for approximately one hour under anhydrous reactions conditions. The disappearance of the isocyanate infrared absorbance band at 2311 cm-1 and a appearance of a thiourea infrared absorbance at 1653cm-1 confirm the completed reaction.

The preferred components of the railway diesel crankcase lubricating oil composition of the present invention are those which are effective in a range of from about 0.1 to about 5 wt % based on the total lubricating oil composition. However, it is preferred to employ from about 0.5 to 2.0 wt % of the derivative based on the weight of the lubricating oil with the most preferred concentration being between 0.75 to about 1.5 wt %.

The railway diesel crankcase lubricating oil composition comprises:

(a) a major portion of a liquid paraffinic mineral oil having a viscosity at 100° C. of about 52.5 SUS minimum, a paraffinic mineral oil having a viscosity at 100° C. of about 75.0 to 79.0 SUS and a liquid naphthenic mineral oil having a viscosity at 100° C. of about 75.0 to 80.0 SUS, and (b) a minor component of an oxidation and corrosion inhibiting agent; a condensate product prepared as mentioned earlier from the reaction of a oligomeric isobutylene, maleic anhydride, 2,5-dimercapto 1,3,4-thiadiazole, and an N-alkylalkylene diamine.

OIL OXIDATION TEST

The test method involves bubbling 5 liters of oxygen per hour through 300 mls of test oil composition at 285° F. in which there is immersed a 1"X3"X0.06 inch steel -backed copper-lead test specimen, cut from bearing stock. The viscosity of the test oil is measured before and after the 144 hour test period where the greater the differences between these two viscosities is reflective of higher oxidation levels.

Moreover, the test specimen is weighed before and after the test period where the greater the weight loss the greater is the corrosion in the formulation. And, further, the larger the amount of copper, lead, and iron moieties found in the oil after the test, the greater the oxidation/corrosion deterioration thereof.

The representative Formulations A,B and comparative Formulation C and their oxidation test results are reported below in Table I.

TABLE I

Summary OF Union Pacific Oxidation Test Results After 144 Hours At 285° F.

| Composition, Wt % | UNTREATED (A) | TREATED (B) | (C) |
|---|---|---|---|
| SNO-20 | 5.00 | 5.00 | 5.00 |
| SNO-40 | 48.30 | 48.30 | 48.30 |
| 75/80 Pale Oil | 37.00 | 37.00 | 37.00 |
| PC-140* | 5.55 | 5.55 | 5.55 |
| TC-9596A** | 4.05 | 4.05 | 4.05 |
| Chlorowax 500° C. | 0.05 | 0.05 | 0.05 |
| TC-10314** | 0.05 | 0.05 | 0.05 |
| TX-1416*** ppm | 150 | | |
| Experimental Additive | — | 0.75 | 1.50 |
| Union Pacific Oxidation Test | | | |
| Weight Loss, mg. | 280 | 4.6 | 3.4 |
| Viscosity Increase, %. | 160 | 72.0 | 59.9 |

*(PC-140) is a phenolic stabilizing agent; (TC-9596A and TC-10314) and *(TX-1416) are, respectively, aromatic and dialiphatic - Mannich-base anti-oxidants; and all PC, TC and TX products are manufactured and sold by Texaco Chemical Company of Houston, Texas.

It is immediately evident that the incorporation of 0.75 wt % or 1.50 wt % of the experimental oligomeric additive imparts oxidative and corrosion resistance of the railway oil.

We claim:

1. A railway diesel crankcase lubricant composition comprising a major portion of a diesel lubricating oil and a minor amount of, as an oxidation and corrosion inhibiting agent, a condensate product prepared by the process comprising:

(a) reacting a dibasic acid anhydride of the formula:

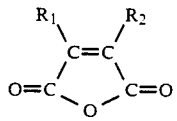

where $R_1$ and $R_2$ each are hydrogen or a $(C_1-C_{10})$ linear or branched alkyl or cyclic alkyl group; with an oligomeric isobutylene represented by the formula

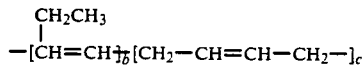

where the sum of the repeat units, b and c, range from 10 to 500 so that the material has a corresponding molecular weight ranging from about 500 amu to 15,000 amu to form oligomeric(isobutylene-graft-succinic anhydride);

(b) reacting said oligomeric (isotutylene-graft-succinic anhydride) with an N-alkyl diamine represented by the structure,

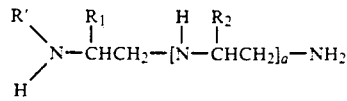

wherein R', $R_1$ and $R_2$ each are hydrogen or a $(C_1-C_{10})$ linear or branched hydrocarbon group and a is an integer between 0 and 7; to produce oligomeric[isobutylene-graft-(tetraethylenetetraamine)-succinimide-amine];

(c) reacting said oligomeric [isobutylene-graft-(tetraethylenetetraamine)-succinimide-amine] with a polyaromatic diisocyanate represented by the formula:

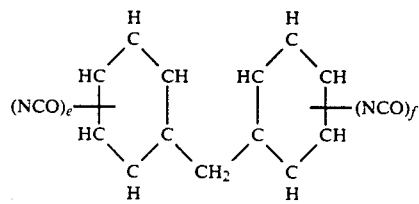

where e and f each are integers from 1 to 10 and the orientation of each isocyanate relative to one another is ortho, ortho; ortho,para; para,para; meta,meta; ortho,meta; meta,para; to produce Oligomeric[isobutylene-graft-((tetraethylenetetraamine)-succinimide)-4-phenylurea-4'isocyanophenylmethane];

(d) reacting said oligomeric, [isobutylene-graft-(tetraethylenetetraamine)-succinimide)-4-phenylurea-4 isocyanophenylmethane with a heterocyclic 1,3,4-thiadiazole nucleus represented by the formula:

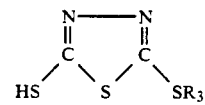

where $R_3$ is hydrogen or a $(C_1-C_{10})$ hydrocarbon or linear or branched aliphatic alcohol or amine; to produce a condensation product of oligomeric-[isobutylene-graft-((tetraethylenetetraamine)-succinimide)-4-phenylurea-4,-[2-thiourea-(5-mercapto-1,3,4-thiadiazole)-phenylmethane]; and (e) recovering said condensation product.

2. The railway diesel crankcase lubricant composition of claim 1, wherein said oligomeric olefin has a molecular weight (Mn) ranging from about 800 to about 2500 amu.

3. The railway diesel crankcase lubricant composition according to claim 1, wherein the minor amount of inhibiting agent ranges from 0.1 wt % to 15.0 wt % of said lubricant composition.

4. The railway diesel crankcase lubricant composition according to claim 1, wherein the minor amount of inhibiting agent ranges from 1.0 wt % to 2.0 wt %.

* * * * *